United States Patent [19]
Tisbo

[11] 3,840,140
[45] Oct. 8, 1974

[54] CABLE CLOSURE

[76] Inventor: Cosmo N. Tisbo, 1940 Lunt Ave., Elk Grove Village, Ill. 60007

[22] Filed: Aug. 31, 1972

[21] Appl. No.: 285,548

[52] U.S. Cl. .............. 220/3.8, 220/3.92, 220/42 F, 174/72 A, 174/65 R
[51] Int. Cl. ............................................. H02g 3/08
[58] Field of Search .............. 220/3.8, 41, 3.94, 66, 220/40; 174/72 A, 101, 65 R, 67; 229/5.5

[56] References Cited
UNITED STATES PATENTS

| | | | |
|---|---|---|---|
| 2,023,433 | 12/1935 | McConnell | 247/3 |
| 2,489,245 | 11/1949 | Sola | 220/3.2 |
| 2,921,607 | 1/1960 | Caveney | 138/75 |
| 3,019,333 | 1/1962 | Pascucci | 240/51.11 |
| 3,126,444 | 3/1964 | Taylor | 174/101 |
| 3,299,199 | 1/1967 | Mattingly | 174/50 |

*Primary Examiner*—William T. Dixson, Jr.
*Assistant Examiner*—Joseph Man- Fu Moy
*Attorney, Agent, or Firm*—Anthony S. Zummer

[57] ABSTRACT

A cable closure has three principal elements, that is, an extruded channel; an extruded cover releasably mountable on the channel; and an injection-molded end cap releasably mountable on the end of the channel and cooperative with the cover. The channel includes a floor and a pair of resilient side walls normally perpendicular to the floor, with an ear formed integral with the free edge of each of the side walls. The cover includes a top, with a cover lock formed integral with each of the opposite edges of the top for engagement with the ears of the channel. The end cap has a generally trapezoidal end plate having an apron formed integral with the outer periphery of the end plate. A pair of slots is positioned in the apron for receiving a portion of the cover lock and the ears of the channel.

5 Claims, 6 Drawing Figures

PATENTED OCT 8 1974
3,840,140
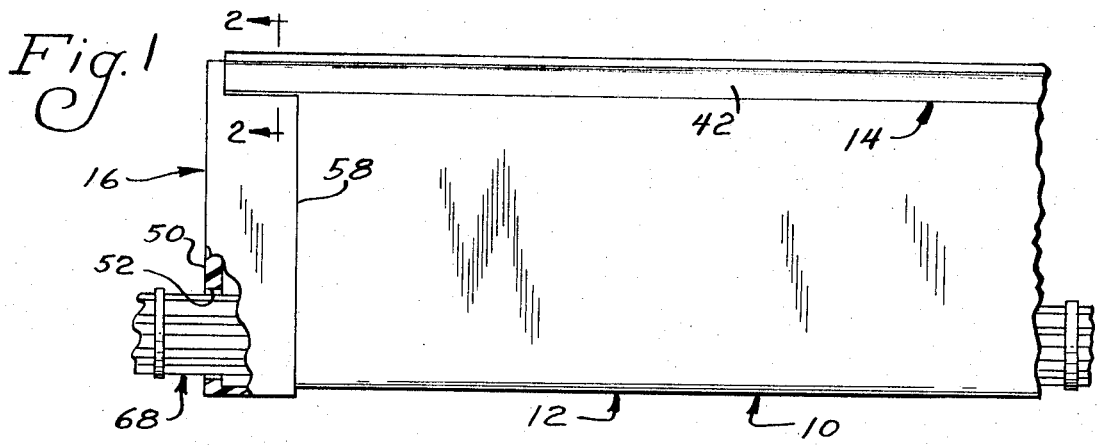
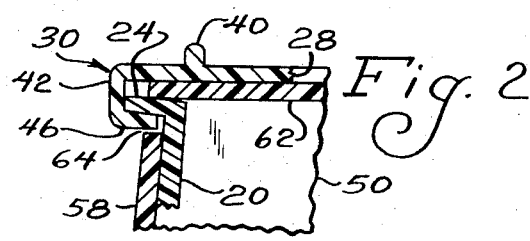
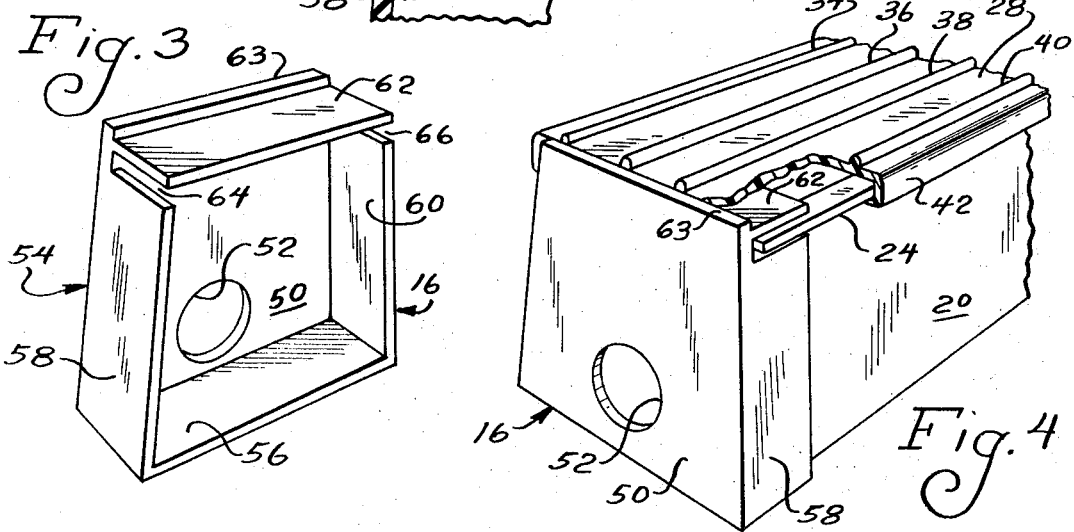
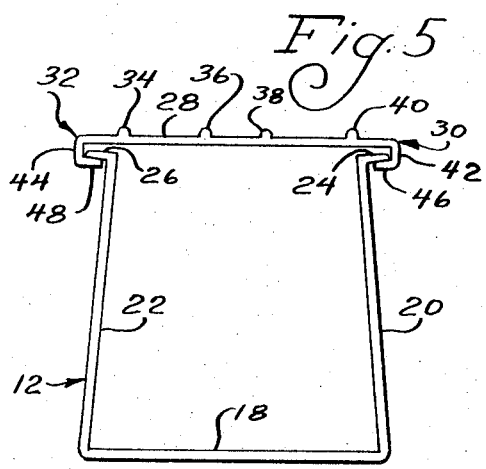
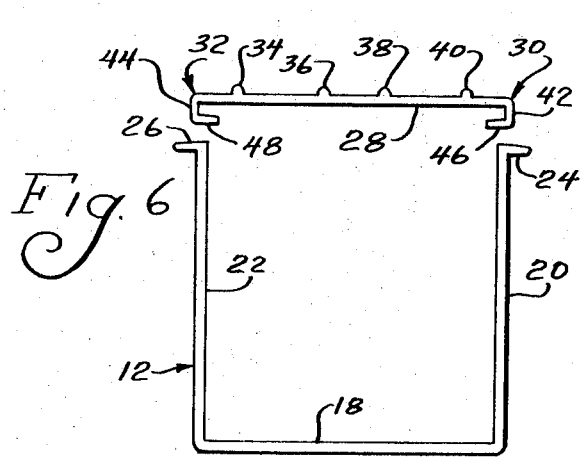

CABLE CLOSURE

BACKGROUND OF THE INVENTION

Various types of industry have adopted the use of an electrical wire harness or cable bundle to facilitate the production of various parts. In addition, cable bundles are also used in a variety of fields, even when not part of a wire harness. One of the problems encountered in using a cable bundle or a wire harness is the positioning of the bundle or harness. Furthermore, there is the problem of accessibility of the wire harness or cable bundle once it is installed. Cable closures as such have been used heretofore for holding cable bundles or wire harnesses. Inasmuch as the cable closure is an auxiliary piece of equipment, it is necessary that this auxiliary piece of equipment be made inexpensively; but it still must be able to perform its very important function. Various configurations have been used heretofore for holding wire harnesses or cable bundles, including open wire frames and the like. It is desirable, in certain cases, to provide a cable closure which affords a certain amount of protection to the wires contained in a cable closure. It is desirable to provide a cable closure construction which includes a cover, which cover may be readily and easily removed should it be necessary to inspect the parts or to make repairs. Furthermore, the cover should be easily reinstalled to enclose the wires. It is desirable not only to include a cover as part of the closure, but also to close the ends thereof. It may be appreciated that, in order to close the ends, the construction must be such that the end closure portion must be compatible with the other portions of the cable closure and must be so arranged as to allow the cover to be removed and reinstalled while a wire harness is contained in the closure.

SUMMARY OF THE INVENTION

The present invention relates to an improved construction of a cable closure wherein the closure includes a channel for holding a wire harness or cable bundle. The channel is an extruded single part of a resilient and electrically non-conductive material. The channel generally includes a floor, with a pair of resilient side walls formed integral with opposite edges along the length of the floor. The side walls are generally perpendicular to the floor. Each of the side walls has an ear formed integral with its free edge. The cable closure also includes a cover having a generally flat top, with reinforcement ribs formed integral with the upper or outer surface of the top along the entire length of the top. A cover lock is formed integral with each of the opposed edges of the top and extends the length of the top for engagement with the ears of the side walls to pull the side walls toward each other and for engagement with the ears so that the resilience of the side walls tends to keep the ears in the cover lock and to hold the cover in place. An end cap is provided for the end of the channel, which end cap has an end plate having a generally trapezoidal outline. An apron formed integral with the outer periphery of the edge of the end plate is perpendicular to the end plate. The apron has a pair of slots which receive a portion of the ears of the channel and a portion of the cover lock. The apron extends over a portion of the side walls and the floor of the channel, and has a portion positioned under the top of the cover. The end plate has an aperture for receipt of a wire harness, so that the harness may be positioned in the cable closure through the end cap.

It is a principal object of the present invention to provide an improved construction of a cable closure wherein the cover may be readily removed from a channel supporting a wire harness and may be readily remounted on the channel and providing a good seal therebetween.

It is a further object of the herein-disclosed invention to provide an improved cable closure construction wherein an end cap is positioned on the end of the channel for closing the channel, which cap does not affect the removal or positioning of a cover from or on a channel.

It is a further object of the present invention to provide an inexpensive cable closure construction.

Other objects and uses of the present invention will become readily apparent to those skilled in the art upon a perusal of the following specification in light of the accompanying drawing.

BRIEF DESCRIPTION OF THE DRAWING

FIG. 1 is a side elevational view of a cable closure embodying the present invention, shown with a wire harness mounted therein, with a portion broken away in order to show better the construction of the closure;

FIG. 2 is an enlarged fragmentary cross-sectional view taken on Line 2—2 of FIG. 1, showing the interrelationship of a channel, a cover and an end cap of the cable closure of FIG. 1;

FIG. 3 is a perspective view of the end cap of FIG. 1;

FIG. 4 is an enlarged fragmentary perspective view of the cable closure shown in FIG. 1;

FIG. 5 is a cross-sectional view, showing the cover mounted on the channel of the cable closure, with the wire harness removed; and FIG. 6 is a cross-sectional view, showing the channel in an unstressed attitude with the cover positioned above the channel prior to mounting of the cover on top of the channel and with the wire harness removed.

DESCRIPTION OF THE PREFERRED EMBODIMENT

Referring now to the drawing, and especially to FIG. 1, a cable closure embodying the herein-disclosed invention is shown therein and is generally indicated by numeral 10. The cable closure generally includes an extruded plastic channel 12, an extruded plastic cover 14 releasably locked to the channel 12, and an end cap 16 mounted on one end of the channel.

The channel 12, which is made of any one of the well-known plastic electrically non-conductive materials, includes an elongated flat floor 18 having a pair of side walls 20 and 22 formed integral with opposed sides of the floor 18. The side walls 20 and 22 are mirror images of each other; and each has a free edge. The side walls 20 and 22 are resilient, so that they may be bent resiliently inward toward each other, for reasons which will become apparent hereinafter. An ear 24 is formed integral with the upper or free edge of the side wall 20. A like ear 26 is formed integral with the free edge of side wall 22. The ears 24 and 26 extend over the entire length of the side walls. The ears are perpendicular to their respective side walls.

The cover 14 is also extruded from the same material as channel 12. The cover 14 includes an elongated flat top 28, which has cover locks 30 and 32 formed integral with opposed edges of the top 28. Four elongated ribs 34, 36, 38 and 40 are formed integral with the top 28 to provide rigidity to the top.

The cover locks 30 and 32 are identical in construction to each other. The cover locks 30 and 32 include risers 42 and 44, respectively, which risers 42 and 44 are formed integral with the respective longitudinal edges of the top 28. The risers 42 and 44 are perpendicular to the top 28 and extend away from the side of the top having the elongated ribs. The cover locks 30 and 32 also include tongues 46 and 48, which are formed integral with risers 42 and 44, respectively. The width of the tongues 46 and 48 is less than the width of the respective ears, so that the ears are engageable with the respective risers for sealing therebetween. The tongues 46 and 48 are perpendicular to the risers 42 and 44, respectively, and extend inwardly toward each other for engagement with the ears 24 and 26, respectively, as will be discussed hereinafter. The inward edges of the tongues are parallel to each other, and are spaced apart a distance substantially equal to the width of the floor.

The end cap 16, which is an injection-molded plastic member of an electrically non-conductive material, includes a trapezoidal end plate 50, which has, in this instance, a single cable aperture 52. An apron 54 is formed integral with the outer periphery of the plate 50 and is substantially perpendicular to the plate 50. The apron includes a floor portion 56 on the longer of the parallel sides of the end plate. A pair of side portions 58 and 60 are formed integral with the two non-parallel sides of the end plate 50. A top portion 62 having a stop ridge 63 extending across the top portion is formed integral with the shorter parallel side of the end plate. The height of stop ridge 63 is equal to the thickness of top 28. A slot 64 is formed in the side portion 58; and a slot 66 is formed in the side portion 60. The slots each have a width great enough to receive their respective ears and tongues, as may be seen in FIG. 2.

As may be seen in FIG. 1, a cable bundle or wire harness generally indicated by numeral 68 is shown positioned in the channel 10 and extending through the aperture 52. The cable bundle is threaded through the aperture 52. The end cap is placed on the end of the channel 12, with the slots 64 and 66 receiving the ears 24 and 26, respectively. In order to mount the end cap on the end of the channel, the side walls 20 and 22 are bent inwardly toward each other; and the end cap is slipped over the end of the channel, so that the exterior surface of the floor 18 is placed into engagement with floor portion 56 and the release of the side walls places a portion of the side walls 20 and 22 into engagement with the side portions 58 and 60 of the apron, with the ears 24 and 26 in the respective slots.

The cover 14 is mounted on the channel by compressing slightly the side walls 20 and 22 and placing the top into engagement with the exterior surface of the top portion 62 and into abutment with stop ridge 63. The side walls 20 and 22 are released so that the ears 24 and 26 are placed into resilient engagement with the tongues 46 and 48 and the risers 42 and 44, respectively. The width of each of the risers is greater than the combined thickness of the respective ear and the top portion of the apron, so that the ear and the top portion of the apron may be positioned between the top 28 and the respective tongue, as may be seen in FIG. 2. In order to remove the cover, it is necessary only to compress the side walls so that the cover may be lifted off the channel.

Although a specific embodiment of the present invention has been shown and described in detail above, it is readily apparent that those skilled in the art may make various modifications and changes without departing from the spirit and scope of the present invention. It is to be expressly understood that the present invention is limited only by the appended claims.

What is claimed is:

1. A cable closure comprising, an elongated unitary channel having an elongated floor and an elongated resilient side wall formed integral with each of the elongated edges of the floor, each side wall being substantially perpendicular to the floor in an unstressed attitude, a cover lockably mountable on the side walls to close the open side of the channel, said cover including a top and a cover lock engageable with the free edge of the side walls to hold the cover onto the channel and to hold the side walls in a slightly inwardly-disposed attitude, and an end cap mounted on one end of the channel for closing said end of the channel, said end cap including an end plate having a generally trapezoidal configuration, and an apron formed integral with the outer periphery of the end plate for engagement with a portion of the channel, said cover is an extruded electrically non-conductive member having a plurality of elongated ribs formed integral with one side of the top, said cover lock including a riser formed integral with each of the opposed longitudinal edges of the top and extending over the length of the top, each of said risers being parallel to the other riser and extending in a direction opposite to the side having the ribs, and an inwardly-extending tongue formed integral with each of the risers, each of said tongues extending the length of the top and being substantially parallel to the top; said channel including an ear formed integral with the entire length of the free edge of each of the side walls, each of said ears being perpendicular to its respective side wall and being engageable with a tongue of the cover to hold the cover onto the channel; and said end cap is a single injection-molded member wherein said apron includes a floor portion on the longer parallel side of the end plate engageable with a portion of the exterior surface of the floor of the channel, a pair of side portions on the non-parallel sides of the end plate engageable with a portion of the exterior sides of the side walls of the channel, a top portion formed integral with the shorter parallel side of the end plate and being positionable in engagement with a portion of the inner surface of the top, and each of the side portions including a slot for receiving a portion of a tongue and a portion of an ear.

2. A cable closure comprising, an elongated unitary channel having an elongated floor and an elongated resilient side wall formed integral with each of the elongated edges of the floor, each side wall being substantially perpendicular to the floor in an unstressed attitude, a cover lockably mountable on the side walls to close the open side of the channel, said cover including a top and a cover lock engageable with the free edge of the side walls to hold the cover onto the channel and to hold the side walls in a slightly inwardly-disposed attitude, and an end cap mounted on one end of the channel for closing said end of the channel, said end cap including an end plate having a generally trapezoidal configuration, and an apron formed integral with the outer periphery of the end plate for engagement with a portion of the channel, said apron of the end cap is substantially perpendicular to the end plate and includes a floor portion on the longer of the parallel sides of the end plate for engagement with a portion of the exterior surface of the floor of the channel, a pair of side portions being on the non-parallel sides of the end plate engageable with a portion of the exterior sides of the side walls of the channel, and a top portion formed integral with the shorter parallel side of the end plate and being positionable for engagement with a portion of the inner side of the top, each of said side portions of the apron including a slot for receiving a portion of the channel and a portion of the cover lock of said cover.

3. A cable closure comprising, an elongated unitary channel having an elongated floor and an elongated resilient side wall formed integral with each of the elongated edges of the floor, each side wall being substantially perpendicular to the floor in an unstressed attitude, a cover lockably mountable on the side walls to close the open side of the channel, said cover including a top and a cover lock engageable with the free edge of the side walls to hold the cover onto the channel and to hold the side walls in a slightly inwardly-disposed attitude, and an end cap mounted on one end of the channel for closing said end of the channel, said end cap including an end plate having a generally trapezoidal configuration, and an apron formed integral with the outer periphery of the end plate for engagement with a portion of the channel, said apron of the end cap includes a floor portion formed integral with the longer parallel side of the end plate for engagement with a portion of the exterior surface of the floor of the channel, a pair of side portions formed integral with the non-parallel sides of the trapezoidal end plate engageable with a portion of the exterior sides of the side walls of the channel, a top portion formed integral with the shorter parallel side of the end plate and being positionable for engagement with a portion of the inner side of the top, and each of said side portions of the apron including a slot adjacent to the top portion; and said channel includes an ear formed integral with the entire length of the free edge of each of the side walls, each of said ears being perpendicular to its respective side wall, each of said ears having a portion at one end thereof positionable in the respective slot of the side portion of the end cap apron.

4. A cable closure comprising, an elongated unitary channel having an elongated floor and an elongated resilient side wall formed integral with each of the elongated edges of the floor, each side wall being substantially perpendicular to the floor in an unstressed attitude, a cover lockably mountable on the side walls to close the open side of the channel, said cover including a top and a cover lock engageable with the free edge of the side walls to hold the cover onto the channel and to hold the side walls in a slightly inwardly-disposed attitude, and an end cap mounted on one end of the channel for closing said end of the channel, said end cap including an end plate having a generally trapezoidal configuration, and an apron formed integral with the outer periphery of the end plate for engagement with a portion of the channel, said cover is an extruded electrically non-conductive member having a plurality of elongated ribs formed integral with the top and being coextensive therewith, said cover lock includes a riser formed integral with each of opposed longitudinal edges of the top and extending the length of the top, each of said risers being parallel to each other and extending in a direction opposite to the side of the top having the ribs, and an inwardly-extending tongue formed integral with each of the risers, each of the tongues extending the length of the top and being substantially parallel to the top; and said apron including a floor portion on the longer of the parallel sides of the end plate for engagement with the exterior surface of the floor of the channel, a pair of side portions on the non-parallel sides of the end plate engageable with a portion of the exterior sides of the side walls of the channel, a top portion formed integral with the shorter parallel side of the end plate and being engageable with the inner side of the top, a stop ridge formed integral with the top portion and having a height substantially equal to the thickness of the top, and each of the side portions of the apron including a slot for receiving a portion of the respective inwardly-extending tongue of the cover.

5. A cable closure comprising, an elongated unitary channel having an elongated floor and an elongated resilient side wall formed integral with each of the elongated edges of the floor, each side wall being substantially perpendicular to the floor in an unstressed attitude, a cover lockably mountable on the side walls to close the open side of the channel, said cover including a top and a cover lock engageable with the free edge of the side walls to hold the cover onto the channel and to hold the side walls in a slightly inwardly-disposed attitude, and an end cap mounted on one end of the channel for closing said end of the channel, said end cap including an end plate having a generally trapezoidal configuration, and an apron formed integral with the outer periphery of the end plate for engagement with a portion of the channel, said cover is an extruded electrically non-conductive member having a plurality of elongated ribs formed integral with one side of the top, said cover lock including a riser formed integral with each of the opposed longitudinal edges of the top and extending over the length of the top, each of said risers being parallel to the other riser and extending in the direction opposite to the side having the ribs, and an inwardly-extending tongue formed integral with each of the risers, each of said tongues extending the length of the top and being substantially parallel to the top and to each other, said tongues having their inward edges being spaced a distance substantially equal to the width of the floor of the channel; said channel including an ear formed integral with the entire length of the free edge of each of the side walls, each of said ears being perpendicular to its respective side wall and being engageable with a respective tongue of the cover to hold the cover onto the channel, each of said ears having a width greater than its respective tongue for engagement of the outer edge of each of the ears with its respective riser; and said end cap is a single injection-molded member wherein said apron includes a floor portion on the longer parallel side of the end plate engageable with a portion of the exterior surface of the floor of the channel, a pair of side portions on the non-parallel sides of the end plate engageable with a portion of the exterior sides of the side walls of the channel, a top portion formed integral with the shorter parallel sides of the end plate and being positionable in engagement with a portion of the inner surface of the top, each of the side portions including a slot having a width greater than the combined thickness of its respective tongue and ear to receive a portion of its respective tongue and a portion of its respective ear, and said end plate having an aperture for receiving an electrical cable; and each of the risers of the cover lock having a width greater than the combined thickness of its respective ear and the top portion of the apron to receive a portion of the respective ear and a portion of the top portion between its respective tongue and the top.

* * * * *